United States Patent
Gavade et al.

(10) Patent No.: US 9,167,297 B2
(45) Date of Patent: Oct. 20, 2015

(54) DISTRIBUTED ENCODING OF CONTENT FOR A NETWORK

(71) Applicant: Verizon Patent and Licensing Inc., Arlington, VA (US)

(72) Inventors: Sameer Gavade, Irving, TX (US); Venkata S. Adimatyam, Irving, TX (US); Tariq Roshan, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 94 days.

(21) Appl. No.: 14/179,233

(22) Filed: Feb. 12, 2014

(65) Prior Publication Data

US 2015/0229989 A1    Aug. 13, 2015

(51) Int. Cl.
| | |
|---|---|
| *H04N 21/4402* | (2011.01) |
| *H04N 21/4405* | (2011.01) |
| *H04N 21/258* | (2011.01) |
| *H04N 21/239* | (2011.01) |
| *H04N 21/2343* | (2011.01) |
| *H04N 21/4363* | (2011.01) |
| *H04N 21/41* | (2011.01) |

(52) U.S. Cl.
CPC ..... *H04N 21/440218* (2013.01); *H04N 21/239* (2013.01); *H04N 21/234309* (2013.01); *H04N 21/25833* (2013.01); *H04N 21/4126* (2013.01); *H04N 21/43637* (2013.01); *H04N 21/4405* (2013.01)

(58) Field of Classification Search
USPC .............. 725/14, 91, 100, 114, 131, 138, 139
See application file for complete search history.

(56) References Cited

U.S. PATENT DOCUMENTS

| | | | |
|---|---|---|---|
| 2008/0263621 A1* | 10/2008 | Austerlitz et al. | 725/139 |
| 2013/0064285 A1* | 3/2013 | Karlsson et al. | 375/240.02 |
| 2014/0281489 A1* | 9/2014 | Peterka et al. | 713/153 |

* cited by examiner

*Primary Examiner* — Mulugeta Mengesha

(57) ABSTRACT

Content, such as video content, may be encoded using encoders that are installed at encoding devices of customers of a telecommunications provider. In one implementation, a server device may maintain presence information relating to an operational state of a number of set-top boxes installed at customer residences; receive an indication of content that is to be encoded; and select a set-top box, of the set-top boxes, to encode the segment, the set-top box being selected based on the operational state of the set-top boxes. The server may further transmit, to the selected set-top box, instructions to initiate encoding of the content and to provide an encoding format for the content; and update the presence information to reflect a result of encoding of the content by the selected set-top box.

20 Claims, 10 Drawing Sheets

DISTRIBUTED ENCODING OF CONTENT FOR A NETWORK

BACKGROUND

Wireless and wired networks may be used to provide a wide variety of services to customers. For example, a telecommunications provider may implement networks that provide services relating to content delivery (e.g., streaming video and audio delivery) as well as other services, such as television programming, cellular wireless mobile data and voice services, and/or wired voice and data services.

Content may be delivered to customers of a telecommunications provider using content delivery techniques such as over-the-top (OTT) content delivery or content delivery that is more closely integrated within the underlying network. OTT content delivery may generally refer to content that is provided to users over a network in which the telecommunications provider delivers the content as a series of Internet Protocol (IP) packets that may be transmitted on a best-effort basis. Other content, such as video on demand (VoD) content, may be delivered using data streams that are associated with guaranteed bit rates and/or other guaranteed quality metrics.

For both OTT content non-OTT content, it may be desirable to encode or transcode the content into a number of different encoding formats. For example, a streaming video service may store different versions of a particular video program, in which each of the different versions encodes the video program using a different codec (e.g., a H.263/MPEG-2 codec, H.264/MPEG-4 codec, a Windows Media Video (WMV) codec, etc) and/or different parameters for the codecs (e.g., different bit rates or other parameters). Due to the potentially large number of combinations of codecs and parameters that may be desired for a particular video program, the particular video program may be associated with a large number of encodings.

DETAILED DESCRIPTION OF PREFERRED EMBODIMENTS

The following detailed description refers to the accompanying drawings. The same reference numbers in different drawings may identify the same or similar elements.

Techniques described herein may provide for the encoding of content, such as audio and/or video content, using encoders that are installed at encoding devices of customers of a telecommunications provider. In one implementation, customers of a telecommunication provider may use set-top boxes (STBs) to provide television channels to a television. The STBs may include encoders that may be used to encode content such as video. Content that should be encoded may be delivered to the STBs over a wired network (e.g., over a fiber optic network), encoded by the STBs, and transmitted back to the network for eventual storage at content delivery servers. Users, such as users associated with computing devices connected to the wired network or to other networks (e.g., a cellular wireless network) may later request the encoded content from the content delivery servers.

In some implementations, the encoding may be performed, by the STBs, in the background relative to the operation of the STBs (e.g., during idle periods or at other times that do not adversely impact users of the STBs). In some implementations, users of the STBs may control when the STBs perform the encoding.

Figure 1:
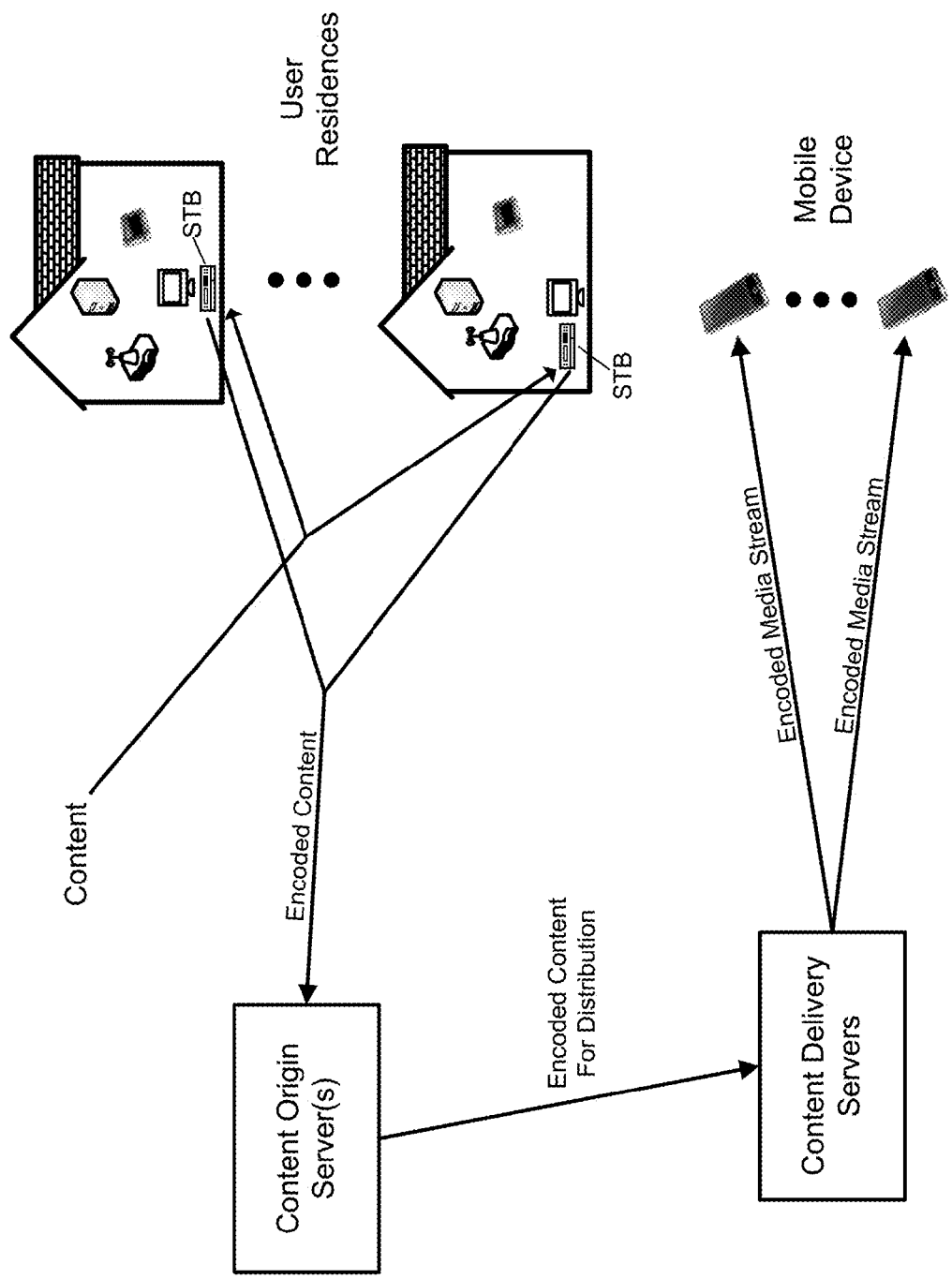
FIG. 1 is a diagram illustrating an overview of concepts described herein.

FIG. 1 is a diagram illustrating an overview of concepts described herein. As shown in FIG. 1, content may be delivered to STBs associated with user residences. The content may include, for example, video and/or audio programs, such as movies, television channels, music, sporting events, and/or other content. In one implementation, the content may include television programming that is normally delivered to the user residences as part of television service. It may be desirable to also provide the content to mobile devices (e.g., smart phones, tablets, or other mobile communication devices). The mobile devices may be associated with customers of a wireless network. The content may be received at the user residences in a format that is not necessarily appropriate for delivery to the mobile devices. The content may thus need to be encoded or transcoded into one or more different encoding formats. In some implementations, it may be desirable to encode a content stream (e.g., a television channel) using a number of different encoding formats. The different encoding formats may represent different codecs, different levels of quality, and/or different encryption (e.g., AES encryption) or digital rights management (DRM) techniques.

In one implementation, the content may be encoded by the STBs as a sequence of a number of fixed or variable sized segments. Thus, a content stream or file may be divided into a number of segments by the STBs.

The STBs that are available, at any given time to perform encoding of the segments, may vary. A server (not shown in FIG. 1) may keep track of the state of the STBs (e.g., keep track of which STBs are available to perform encoding). Thus, a pool of available STBs may be maintained and used when deciding which STB should be used to encode a particular segment.

Each STB, after encoding a particular segment, may transmit the segment to one or more content origin servers. The content origin servers may be responsible for distributing the encoded content to one or more content delivery servers. The content delivery servers may include, for example, one or more servers that are located near an "edge" of a network (e.g., a wireless cellular network) that provides network connectivity to the mobile devices. In response to a request for a particular content item (e.g., a video stream corresponding to a television channel) from a mobile device, the content delivery servers may determine an appropriate encoding to use, fetch the segments corresponding to the appropriate encoding, and transmit the fetched segments to the mobile device as an encoded media stream.

With the techniques described herein, encoding of content, such as video content, may be performed by hardware (e.g., STBs) that is deployed and running as part of the normal operation of the network. The encoding may thus be performed without requiring the network operator to purchase dedicated encoding hardware.

Figure 2:
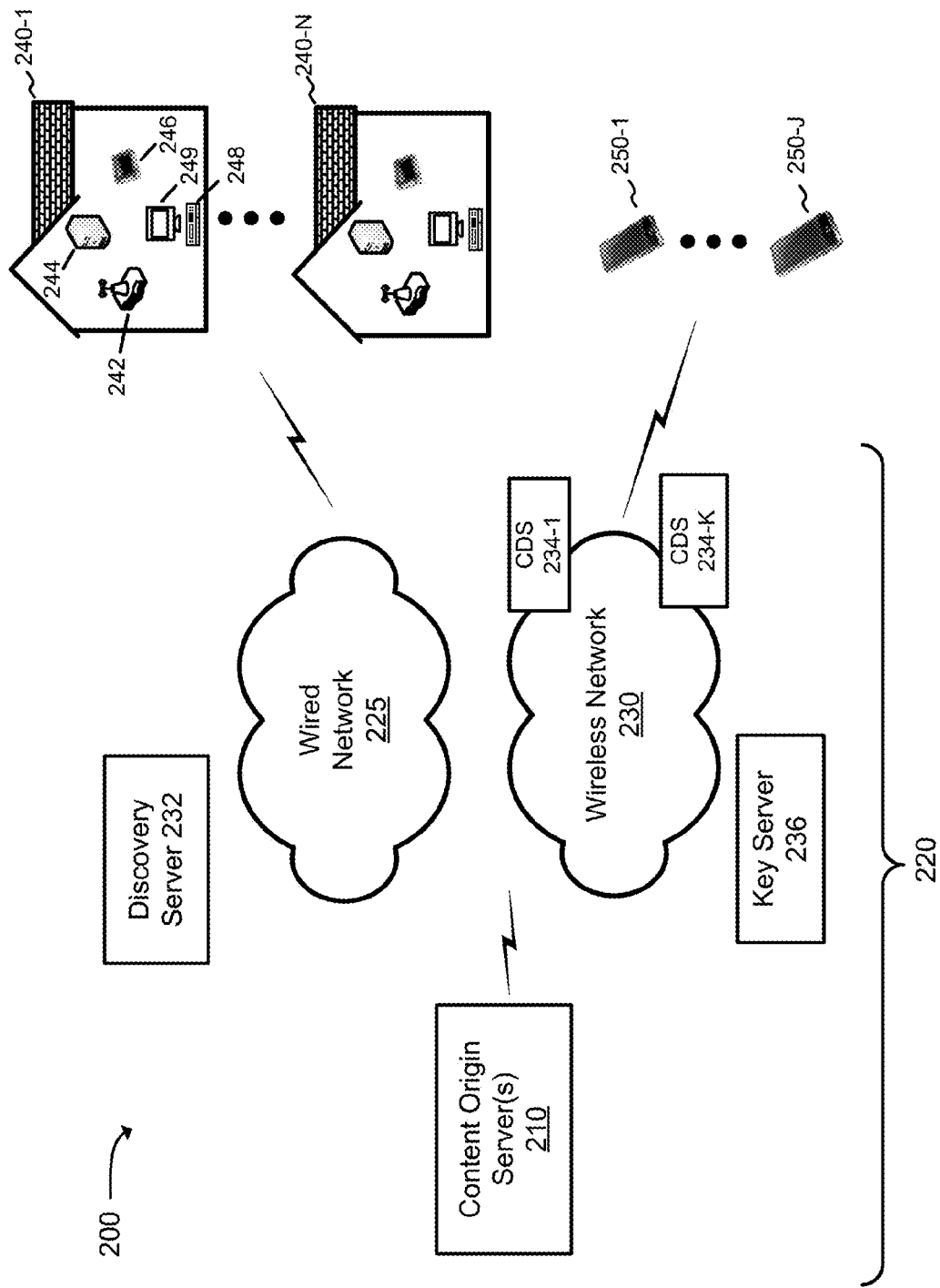
FIG. 2 illustrates an example environment in which systems and/or methods described herein may be implemented.

FIG. 2 illustrates an example environment 200, in which systems and/or methods described herein may be implemented. As shown in FIG. 2, environment 200 may a network 220 that may provide network connectivity to customer premises 240-1 through 240-N (where N is a positive integer) and mobile devices 250-1 through 250-J (where J is a positive integer). Network 220 may include content origin servers 210, discovery server 232, content delivery servers (CDSs) 234-1 through 234-K (where K is a positive integer), and key server 236.

Network 220 may represent a number of different networks. For example, network 220 may include a local area network (LAN), a wide area network (WAN), a metropolitan area network (MAN), and/or another type of network. In some implementations, network 220 may include a packet-based network, such as an Internet Protocol (IP) network. As particularly illustrated in FIG. 2, network 220 may include wired network 225 and wireless network 230. Wired network 225 may include a network used to deliver telecommunication services to residences (e.g., customer premises 240), businesses, or other entities, in which the "last mile" connection from the network to the residence or business includes a wired connection, such as a fiber optic or coaxial-based connection. Wired network 225 may be used to provide, for example, television services, network connectivity (e.g., an Internet connection), traditional telephone services, and/or other services. Wireless network 230 may include a network providing telecommunication services to mobile devices 250 in which the connection with mobile devices 250 is implemented via a wireless connection. Wireless network 225 may include networks based on the Long Term Evolution (LTE) standards or other standards.

Although content origin servers 210, discovery server 232, content delivery servers 234, and key server 236 are particularly illustrated as included in network 220, in practice, network 220 may include a number of other network elements, servers, and/or routers, which, for clarity, are not explicitly illustrated.

Content origin servers 210 may include one or more computing devices that receive and/or aggregate content, such as television programming content (e.g., live broadcast content or non-live content), VoD content (e.g., movies and/or other pre-recorded content), or other content, potentially from a number of sources. The content received by content origin servers 210 may be content that is encoded into discrete segments using a number of encoding formats. Content origin servers 210 may distribute the received content to content delivery servers. Content origin servers 210 may, for example, receive content corresponding to television channels via satellites and may receive content, such as content corresponding to video on demand content, OTT content, or other content, from one or more other sources.

As will be described more detail below, content received by content origin servers 210 may be encoded as discrete segments of content. The encoding of the segments may be performed by a pool of encoding devices, such as a pool of STBs associated with customer premises 240. Each segment may be encoded multiple times. For example, a particular video segment may be encoded at various quality settings (e.g., 15 Mb/s, 30 Mb/s, 60 Mb/s, and 120 Mb/s) using the H.263/MPEG-2 codec. By encoding a segment multiple times, transmission of the segment to a playback device, such as one of mobile devices 250, may be optimized for the network connection and/or hardware capabilities of the mobile device.

Discovery server 232 may include one or more computing devices that manage and/or keep track of available encoding devices (e.g., a pool of all the STBs 248 at residences of customers 240). For example, for each STB that is participating in the encoding of content received by content origin servers 210, discovery server 232 may keep track of the operational state of the STB. The operational state, for a particular STB, may include whether the STB is online (e.g., whether it is powered on), the processing state or load of the STB (e.g., whether it is idle, providing television content to a viewer, recording a television show, etc.), and/or whether it is currently performing an encoding operation requested by discovery server 232. Based on the operational state of the pool of STBs, discovery server 232 may assign the coding of incoming content to the STBs. For example, a STB that is idle may be assigned to encode a next incoming content segment or a content stream.

Content delivery servers 234 may each include one or more computing devices that transmit the encoded segments to mobile devices 250. In some implementations, content delivery servers 234 may be placed near or may be associated with a customer edge of wired network 225 and/or wireless network 230, to thereby allow for efficient delivery of content segments to users. For example, in response to requests from a mobile device 250-1 to receive a particular content item and in response to authentication of mobile device 250-1, content delivery server 234-1 may determine encoding parameters that are appropriate for mobile device 250-1 (e.g., based on the bandwidth received by the mobile device and/or on the software/hardware resources of the mobile device), identify a segment corresponding to the determined encoding parameters, and transmit the segment to mobile device 250-1. A content item (e.g., a movie or television content) that is being streamed to mobile device 250-1 may correspond to a series of encoded segments. Content delivery servers 234 may transmit (e.g., in a sequential manner) the series of encoded segments. Mobile device 250-1 may receive the encoded segments, decode the segments, and play back the content item as a single uninterrupted stream. In some implementations, based on changing network conditions, such as a change in the available bandwidth that can be delivered to mobile device 250-1, content delivery servers 234 may dynamically identify a series of encoded segments with different encoding parameters (e.g., if the bandwidth available to mobile device 250-1 is determined to decrease, content delivery servers 234 may begin to transmit encoded segments that correspond to a smaller encoded size, such as encoded segments that were encoded at a lower bit rate).

Key server 236 may include one or more server devices that provide authentication and eligibility determinations for users, of mobile devices 250, who wish to view content stored at content delivery servers 234. Key server 236 may, for example, operate to authenticate mobile devices 250 and provide session decryption keys through which the mobile devices 250 may decrypt content from content delivery servers 234. In one implementation, authentication may be provided with the assistance of a third party, such as a third party certificate authority.

Customer premises 240 may each represent an entity that is connected to wired network 225 provided by a telecommunication provider. As particularly illustrated, a wired network customer premise 240 may be associated with wireless router 242, desktop computing device 244, tablet computing device 246, STB 248, and television 249. It can be appreciated that the set of computing devices, illustrated in FIG. 2, for a particular customer premise 240, is exemplary. In practice, a residence, business, or other location, corresponding to a customer premise 240, may include a variety of computing and communication devices.

Customer premise 240-1 may be connected to wired network 225 using, for example, a fiber optic connection, a coaxial connection, or another type of connection. A gateway device may be used to connect a wired network customer to wired network 225. For example, for a fiber optic connection, an optical network terminal (ONT) may convert the optical signals into an electrical format that can be used by wireless router 242. Alternatively, the functionality of the ONT may be incorporated into wireless router 242. Wireless router 242 may generally function to provide network connectivity, such as via a local Wi-Fi connection, to computing devices within customer premise 240-1. For example, desktop computing device 244 and tablet computing device 246 may receive network connectivity via wireless router 242. Devices within customer premise 240-1 may be connected via wired connections (e.g., coaxial cable, Telecommunications Industry Association category 5 ("cat 5") cable, etc.) and/or wireless connections.

In the example shown in FIG. 2, STB 248 is shown as connecting to television 249. STB 248 may be used to provide multimedia programming services for television 249. Consistent with aspects described herein, STB 248 may additionally communicate with discovery server 232 to provide presence and/or status information that describes the operational state of STB 248, to discovery server 232. Discovery server 232 may, at certain times, provide encoding instructions relating to content for encoding by STB 248. STB 248 may encode the content and upload the encoded content segments to network 220. For example, STB 248 may transmit the encoded content segments to content origin servers 210 (or, in some implementations, to discovery server 232). Encoding of content segments by STBs 248 (and/or by other devices associated with customer premise 240) will be described in more detail below.

Mobile devices 250 may each include a portable/mobile communication device that is capable of connecting to wireless network 230. For example, mobile device 250 may include a smartphone, a personal digital assistant ("PDA"), a laptop computer, a desktop computer, a tablet computer; or another type of computation and communication device. Mobile devices 250 may each include a radio interface designed to connect to wireless network 230. The radio interface may include a cellular wireless interface.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. Additionally, a number of "servers" are described with respect to FIG. 2. As used herein, a "server" may include a single computing device, clusters of computing devices (e.g., blades or rack-mounted server computers) that are co-located or geographically distributed, cloud-based (e.g., computing as a service) computing solutions, or other arrangements of computing devices.

Figure 3:
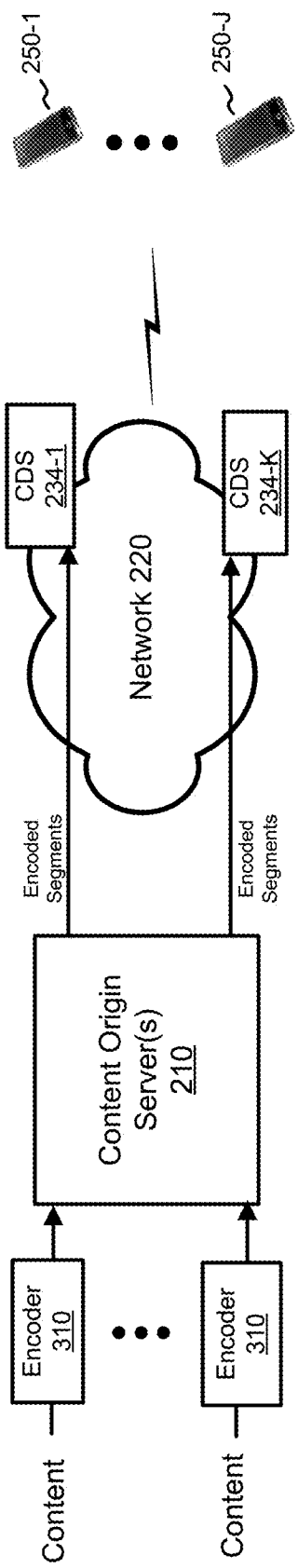
FIG. 3 illustrates an example situation in which dedicated encoding hardware is used to perform content encoding.

FIG. 3 illustrates an example situation in which dedicated encoding hardware is used to perform content encoding. As shown, content, such as audio or video content (e.g., television programming streams, video on demand files, audio streams or files, etc.), may be encoded by encoders 310 before being transmitted to network 220. Encoders 310 may include dedicated encoders, such as commercial grade encoders that are installed to perform encoding of content segments. The purchasing, installation, and maintenance of encoders 320 may represent a non-trivial expense for the operator (e.g., for a telecommunications provider). In contrast, in the implementations illustrated in environment 200, separate encoders 310 may not be required. In some implementations, encoders 310 may be used in conjunction with the implementation illustrated in environment 200. In this situation, encoding may be performed by STBs 248 in order to supplement and/or provide additional encoding capacity to encoders 310.

Figure 4:
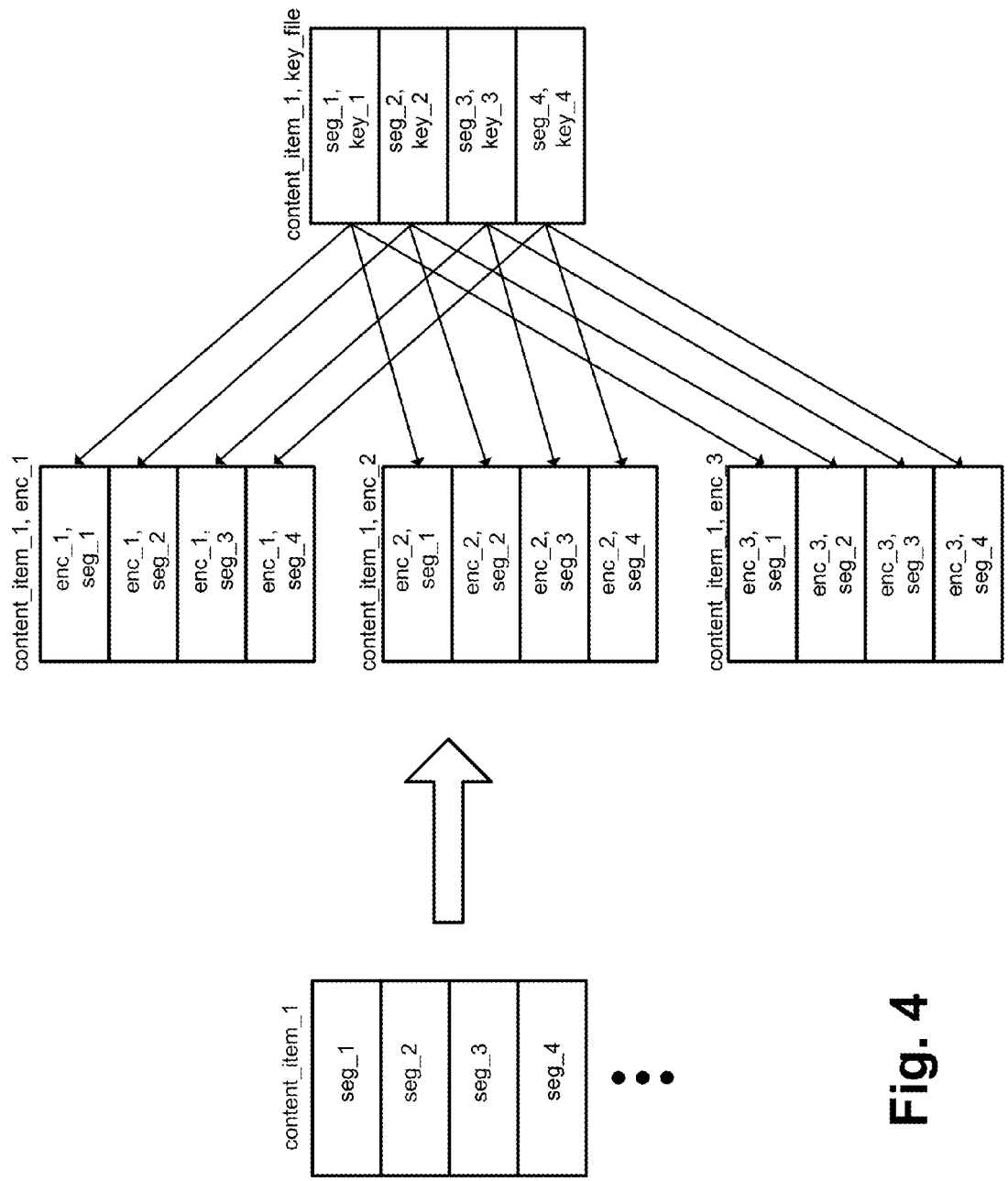
FIG. 4 is a diagram conceptually illustrating the dividing of content items into segments.

FIG. 4 is a diagram conceptually illustrating the dividing of content items into segments. In the example of FIG. 4, a content item ("content_item_1") such as a video stream (e.g., television programming content), video on demand file (e.g., movie), television program, audio program, or portion of a streaming program, may be a content item that is to be encoded or transcoded using a number of different encoding formats (e.g., different codecs, resolutions, encoding parameters, DRM techniques, etc.). In this example, content_item_1 may be encoded using three separate encodings for content_item_1. Four segments are illustrated for content_item_1. For a fixed size content item, such as a movie or other content item of a predetermined size, the number of segments to use in dividing the content item may be determined ahead of time. For a streaming content item of indeterminate size (e.g., a television programming stream), the content item may be dynamically divided into segments as the content item is received.

As illustrated, four segments of content_item_1 are labeled: "seg_1," "seg_2," "seg_3," and "seg_4." Each of the four segments may be encoded using three different encoding formats. For example, the four segments for the first encoding format ("content_item_1, enc_1") are labeled as "enc_1, seg_1," "enc1, seg_2," "enc1, seg_3," and "enc1, seg_4." Each encoded segment may be encrypted and/or associated with a DRM management technique. A key file ("content_item_1, key file") may store decryption keys or other information that may be needed to decode the encoded segments. In this example, a single key file may be used to store decryption keys for each of the encodings corresponding to content_item_1. In some implementations, each segment may be associated with a different key (illustrated as "seg_1, key_1," "seg_2, key_2," "seg_3, key_3," seg_4, key_4." In the context of environment 200, the segments corresponding to the three encoded content items may be stored at content delivery servers 234 and the key file may be stored at key server 236.

Figure 5:
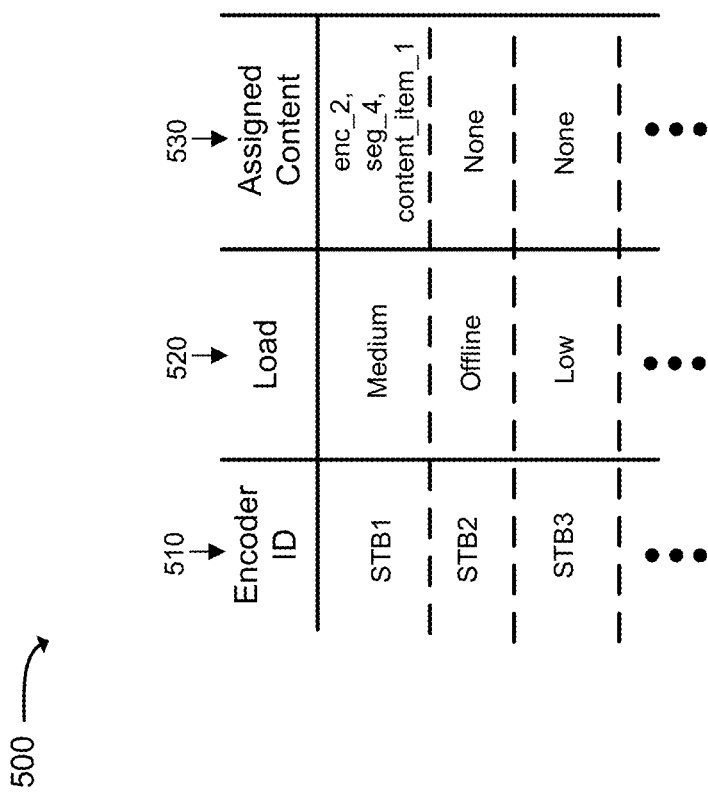
FIG. 5 is a diagram illustrating an example data structure that may be maintained by a discovery server.

FIG. 5 is a diagram illustrating an example data structure 500, such as a data structure that may be maintained by discovery server 232. Data structure 500 may generally be used to monitor the state of the encoding devices, such as STBs 248.

As previously mentioned, discovery server 232 may act to manage and/or keep track of available encoding devices. For example, in one implementation, STBs 248 may be configured to use discovery server 232 as a presence server, in which STBs 248 periodically or occasionally communicate with discovery server 232 to inform discovery server 232 of the current operational state of the STBs. In this manner, discovery server 232 may maintain a list or pool of STBs 248 that are available to encode segments.

As illustrated, each record in data structure 500 may include a number of fields, including: encoder identification (ID) field 510, load field 520, and assigned content field 530. Each record in data structure 500, corresponding to one set of fields 510-530, may represent network presence information for one encoding device. The fields shown for data structure 500 are examples. In alternative possible implementations, different, fewer, or additional fields may be implemented.

Encoder identification field 510 may include information identifying a particular encoder (e.g., a particular STB). For example, encoding identification field 510 may include a name assigned to the particular STB, a serial number assigned to the particular STB, and/or a network address associated with the particular STB. In one implementation, STBs, when initially powered on, may be configured to contact discovery server 232 to register with discovery server 232.

Load field 520 may represent the current state or load of the associated encoding device. In one implementation, load field 520 may include information indicating the current processing load of the encoding device. For example, a particular STB 248, may be in one of a variety of operational states, such as an "idle" state in which a user is not actively using STB 248, a "non-idle" state in which the user is watching television via STB 248, or a state in which all available encoders in STB 248 are being used. The states may, in some implementations, correspond to load states of "low," "medium," and "high," where new segments for encoding may preferentially be distributed to STBs that are in the low or medium load state. Alternatively or additionally, other states or techniques can be used to quantify the availability of STBs 248 to receive new segments for encoding. For example, the STBs may simply indicate whether they are "available" or "not available" to encode segments.

Assigned content field 530 may include information relating to the content that is currently being encoded by an encoding device. Assigned content field 530 may include, for example, a name or identifier relating to a content item, a name or identifier relating to a segment of a particular segment of a content item, a time at which a new segment was transmitted to the encoding device, and/or other information relating to a segment and/or content item currently being encoded by the encoding device.

In the particular example illustrated for data structure 500, three STBs, labeled "STB1," "STB2," and "STB3" are illustrated as being tracked by discovery server 232 as being part of the current pool of encoding devices. STB1 may currently be encoding a segment of content_item_1 (enc_2, seg_4, content_item_1) and is at medium load. STB2 is offline (e.g., it is turned off). STB3 is at low load (e.g., it may be sitting idle in a user residence) and is currently not assigned a segment to encode.

Figure 6:
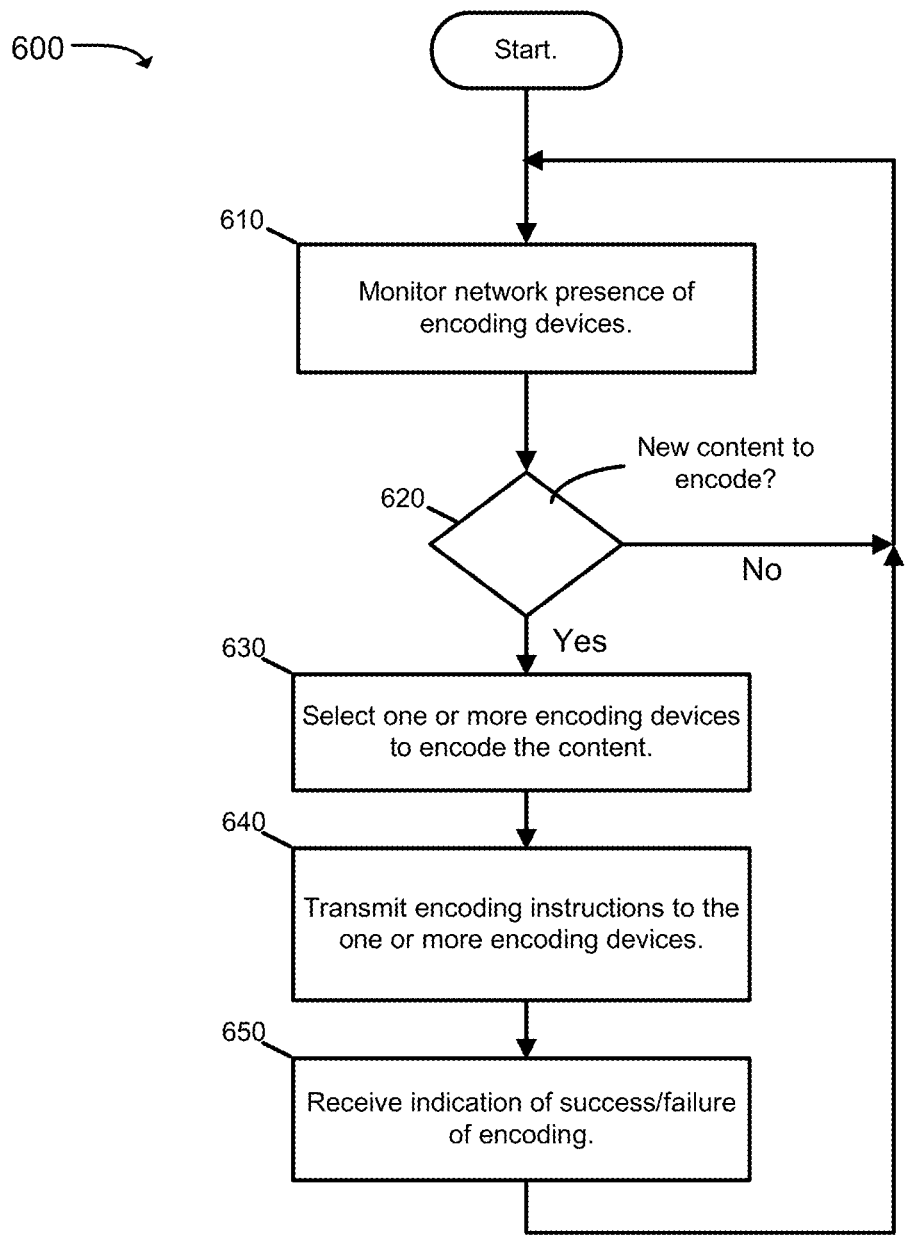
FIGS. 6 and 7 are flowcharts illustrating example processes for encoding data.

FIG. 6 is a flowchart illustrating an example process 600 for encoding data using a pool of distributed encoding devices. Process 600 may be performed by, for example, discovery server 232.

Process 600 may include monitoring network presence of encoding devices (block 610). In one implementation, discovery server 232 may monitor a state of one or more STBs 248. Alternatively or additionally, other computing devices capable performing encoding functions may be monitored by discovery server 232. For example, computers (e.g., desktops or laptops) may run software that enables encoding of content segments. The computers may also be monitored by discovery server 232. As illustrated with respect to data structure 500, monitoring of network presence of encoding devices may include keeping track of the load of the encoding devices and the offline/online state of the encoding devices. In this manner, discovery server 232 may maintain a pool of available encoding devices.

Process 600 may include determining whether there is new content to encode (block 620). As previously mentioned, content that is to be encoded may include television programming (e.g., television programming that is being delivered to customer premises 240 as part of normal television programming that is provided to the customer premises, such as television programming provided via wired connections), and/or discrete files of content (e.g., a movie or other content item having a known length or size). Discovery server 232 may receive indications of the new content to encode, such as from a television programming provider or from other sources.

When content is to be encoded (block 620-YES), process 600 may include selecting one or more encoding devices to use to encode the content. In some implementations, each combination of a content item and an encoding format may be encoded by a single encoding device (e.g., a single STB) for encoding. For example, a content item corresponding to a particular encoding of a particular television channel, may be encoded by a single STB. Alternatively or additionally, in order to provide redundancy in case an encoding device fails or the encoding process is interrupted (e.g., a user begins to watch TV or turns the STB off), some or all of the content items may be forwarded to multiple encoding devices for encoding (i.e., a particular content item and encoding format combination may be independently encoded by a number of encoding devices).

When selecting the one or more encoding devices to encode content, discovery server 232 may use the presence information (e.g., as illustrated in data structure 500) to determine an appropriate encoding device. As previously mentioned, discovery server 232 may choose encoding devices based on the load of the encoding devices. For example, STBs that are idle or that are operating at low capacity may be used to perform the encoding.

In some implementations, discovery server 232 may additionally keep track of the number or amount of segments that are encoded by each encoding device. For instance, a user of an encoding device may specify that the encoding device may be used to encode a particular maximum number of segments per time period (e.g., per day) or a particular maximum encoding file size per time period. As another example, the account of a user, associated with an encoding device, may be credited or otherwise compensated based on the encoding performed by the STB.

Process 600 may further include transmitting, encoding instructions, relating to parameters associated with the encoding of the content, to the one or more encoding devices (block 640). The encoding instructions may indicate, for example, a particular codec to use, parameters relating to the particular codec (e.g., a bit rate), DRM/encryption parameters, the particular content item to encode (e.g., a particular television channel), information relating to the size of the segments for the content item, or other parameters. In some implementations, the encoding instructions may include one or more addresses indicating destinations (e.g., addresses of content origin servers 210) to which the encoded segments should be transmitted. In some implementations, instead of including a television channel that is being delivered to the encoding device as part of television service for the encoding device, the content item to encode may include a discrete file or portion of a file (e.g., a movie or other multimedia file).

Process 600 may further include receiving an indication of success or failure of the encoding (block 650). In some implementations, the encoding devices may transmit an indication, to discovery server 232, when the encoding has successfully completed or when the encoding fails. If a certain time period passes without discovery server 232 receiving an indication that the encoding has successfully completed, discovery server 232 may assume that the encoding has failed. Alternatively or additionally, discovery server 232 may receive an indication of successful encoding from content origin servers 210 (e.g., in response to content origin servers 210 receiving the encoded segment from the encoding device). In one implementation, indications of success or failure may be received on a per-segment basis.

Figure 7:
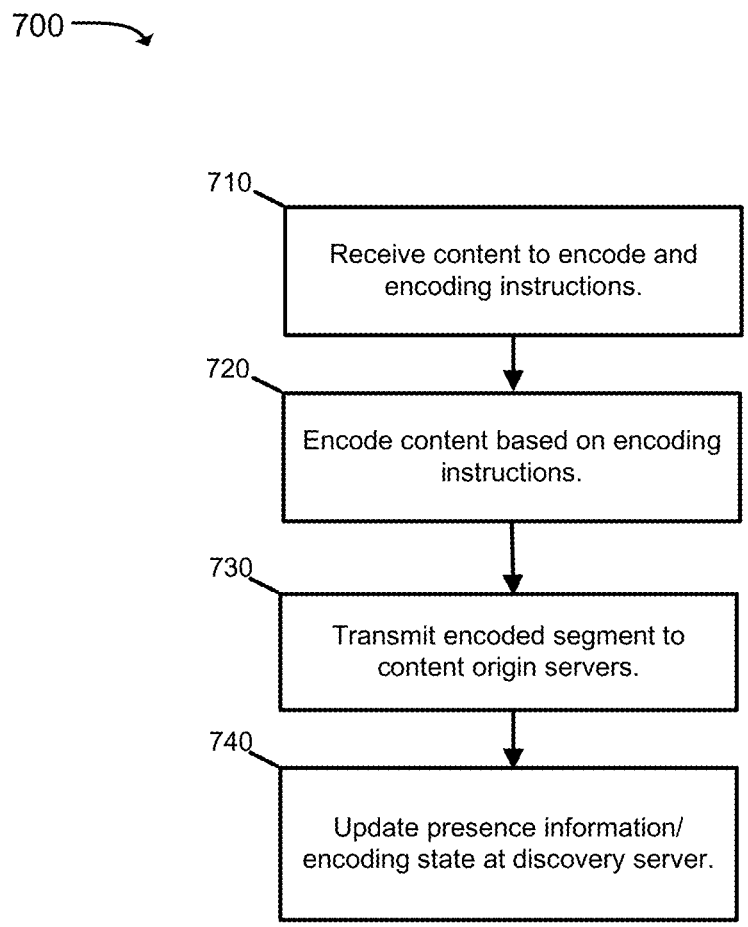

FIG. 7 is a flowchart illustrating an example process 700 for encoding data. Process 700 may be performed by encoding devices such as, for example, STBs 248.

Process 700 may include receiving content to encode and receiving encoding instructions relating to the content segment (block 710). As previously mentioned, the content to encode may be television programming that is being received by the STB (e.g., television programming provided to customer premises 240 as part of normal television service to the customer (e.g., over a coaxial cable or fiber optic connection)). Alternatively or additionally, content to include encode may include a file of segments of a file that are transmitted to the STB for the purpose of encoding. As previously discussed, the encoding instructions may identify the content that is to be encoded. The encoding instructions may additionally indicate, for example, a particular codec to use, parameters relating to the particular codec (e.g., a bit rate), DRM/encryption parameters, a size of the segments for which the content is to be divided, or other parameters.

Process 700 may further include encoding the content based on the encoding instructions (block 720). For some encoding devices, such as certain STBs, encoding may be performed using a dedicated hardware encoder. Other encoding devices may perform the encoding using general purpose processors. In some situations, the encoding may include transcoding the content (i.e., converting from one encoding to another encoding).

Process 700 may further include transmitting the encoded segment(s) to content origin servers 210 (block 730). In the context of environment 200, STBs 248 may transmit, via wired network 225 and/or wireless network 230, the encoded segment to content origin servers 210. Content origin servers 210 may distribute the segments to one or more content delivery servers 234. In some implementations, each content delivery server 234 may store a copy of the encoded segment. In other implementations, some encoded segments may only be stored by particular content delivery servers 234. Process 700 may further include updating presence information and/or the encoding state, relating to the encoding device, with the discovery server (block 740). For example, after encoding a segment, the encoding device may inform discovery server 232 of the completion of the encoding of the segment. The encoding device may further inform discovery server 232 of the post-encoding load of the encoding device (e.g., idle, low load, etc.).

Figure 8:
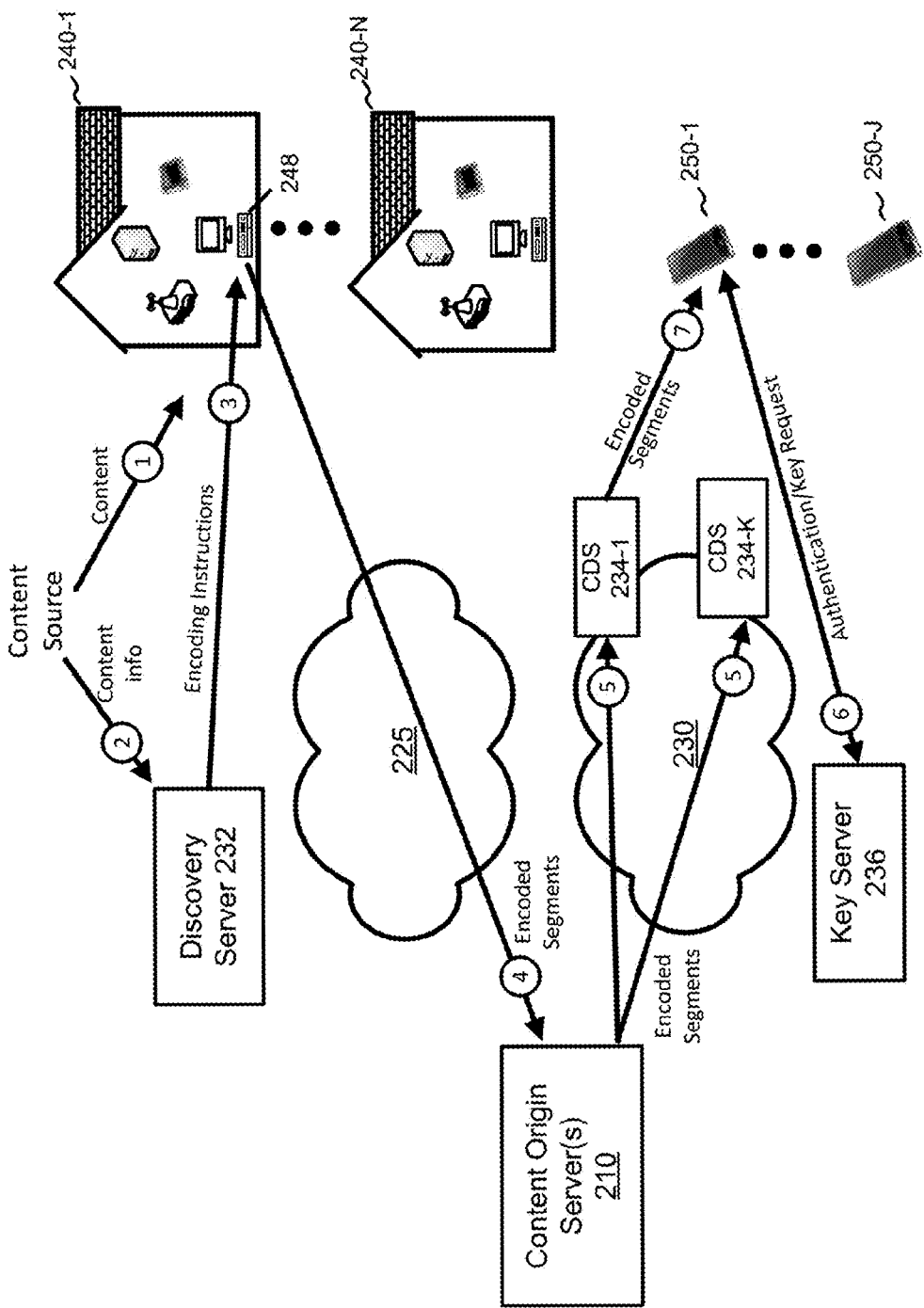
FIG. 8 is a diagram illustrating an example of signaling and/or data flows that may be used to implement distributed encoding of content.

FIG. 8 is a diagram illustrating one example of signaling and/or data flows that may be used in environment 200 to implement distributed encoding of content for a network consistent with aspects described herein. The signaling/data flows that are illustrated in FIG. 8 may be implemented consistent with techniques discussed previously (e.g., consistent with processes 600 and 700).

As illustrated, content (e.g., television programming, a video file or stream, an audio file or stream, etc.) may be received by encoding devices (e.g., a STB) associated with customer premises 240 (arrow "1"). In this example, the content may particularly include television programming that is delivered to the customer premises part of television services that are provided to the customer. Information relating to the content, such as identification of the content that is being transmitted to customer premises 240, may be received by discovery server 232 ("Content info," arrow "2"). Discovery server 232 may select one or more encoding devices from the pool of available encoding devices. As discussed above, discovery server 232 may select the encoding devices based on keeping track of presence information (including load information) corresponding to a pool of possible encoding devices. In one implementation, the pool of possible encoding devices may include STBs installed by a telecommunication provider in the residences of customers.

Discovery server 232 may transmit encoding instructions to the selected one or more encoding devices (arrow "3"). The encoding devices may then encode the content based on the encoding instructions. For example, a particular STB may encode a particular television channel using a particular codec and bit rate that is identified in the encoding instructions received by the particular STB. As previously mentioned, in some implementations, multiple STBs may be simultaneously control to encode the same content and using the same encoding parameters. In this situation, one of the STBs may be designated as the primary encoding device and another may be designated as a backup encoding device. In this manner, redundancy may be provided to guard against the possibility of a failure of the primary encoding device. In one implementation, the backup encoding devices may perform content encoding but may only upload the encoded segments when directed by discovery server 232 (i.e., when the primary encoding device is determined to have failed). Alternatively, backup encoding devices that perform the content encoding and may upload the encoded segments to content origin servers 210, which may discard any content segments that are redundantly received.

The content segments, after encoding by the selected one or more encoding devices, may be transmitted to content origin servers 210 (arrow "4"). In one implementation, the encoded segment may be transmitted through wired network 225 (e.g., a network implemented to provide wired networking services, such as a fiber optic network to deliver television programming network connectivity to user residences). Content origin servers 210 may handle the distribution of the encoded segments to content delivery servers 234 (arrow "5").

At some point, a use of a mobile device, such as mobile device 250-1, may desire to playback content, such as a streaming video program. Mobile device 250-1 may request a key file corresponding to the desired content, from key server 236 (arrow "6"). In response, key server 236 may (potentially after authenticating mobile device 250-1) transmit the key file to mobile device 250-1. Mobile device 250-1 may use the key file to decrypt segments corresponding to the video program. Mobile device 250-1 may request the segments from content delivery server 234-1. Content delivery server 234-1 may correspondingly transmit the segments to mobile device 250-1 (arrow "7"). Mobile device 250-1 may then decrypt (e.g., based on the keys in the key file) the segments and playback the segments, as a continuous video stream, to the user of mobile device 250-1.

Figure 9:
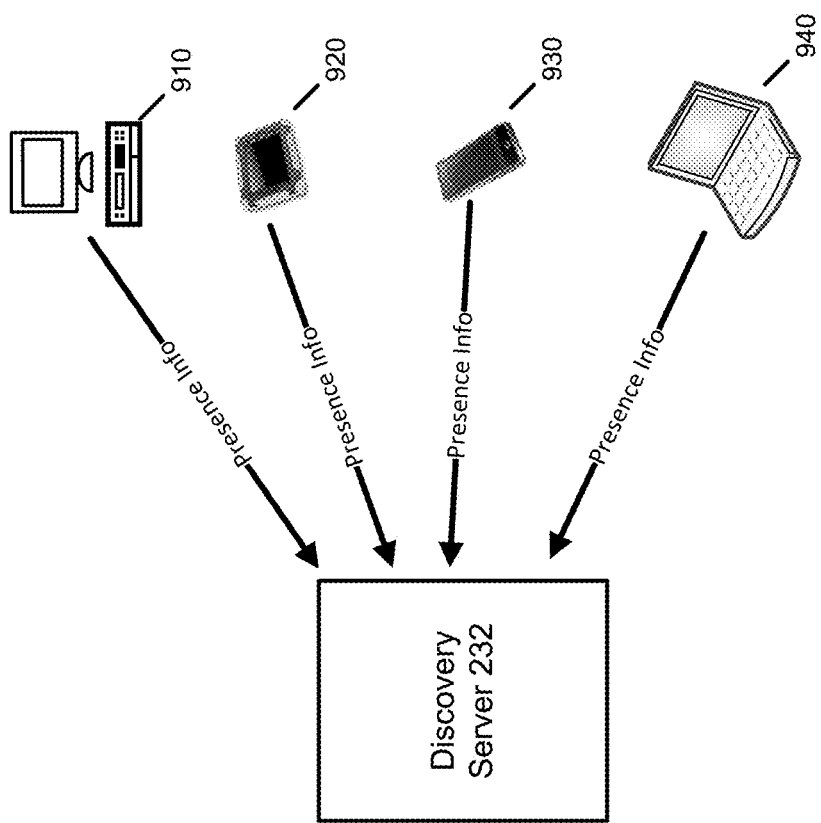
FIG. 9 is a diagram illustrating an example of the use of a variety of computing devices to perform distributed encoding.

Although distributed encoding was discussed above with respect to using STBs to encode content segments, alternatively or additionally, other computing devices may be used to perform the encoding. FIG. 9 is a diagram illustrating an example of the use of a variety of computing devices to perform distributed encoding. As illustrated, a number of different types of computing devices may communicate with discovery server 232 to provide presence information relating to the operational state of the computing devices. The illustrated computing devices include: STB 910, tablet computing device 920, mobile device (e.g., a smartphone) 930, and laptop 940. In this manner, discovery server 232 may maintain a heterogeneous pool of potential encoding devices.

Figure 10:
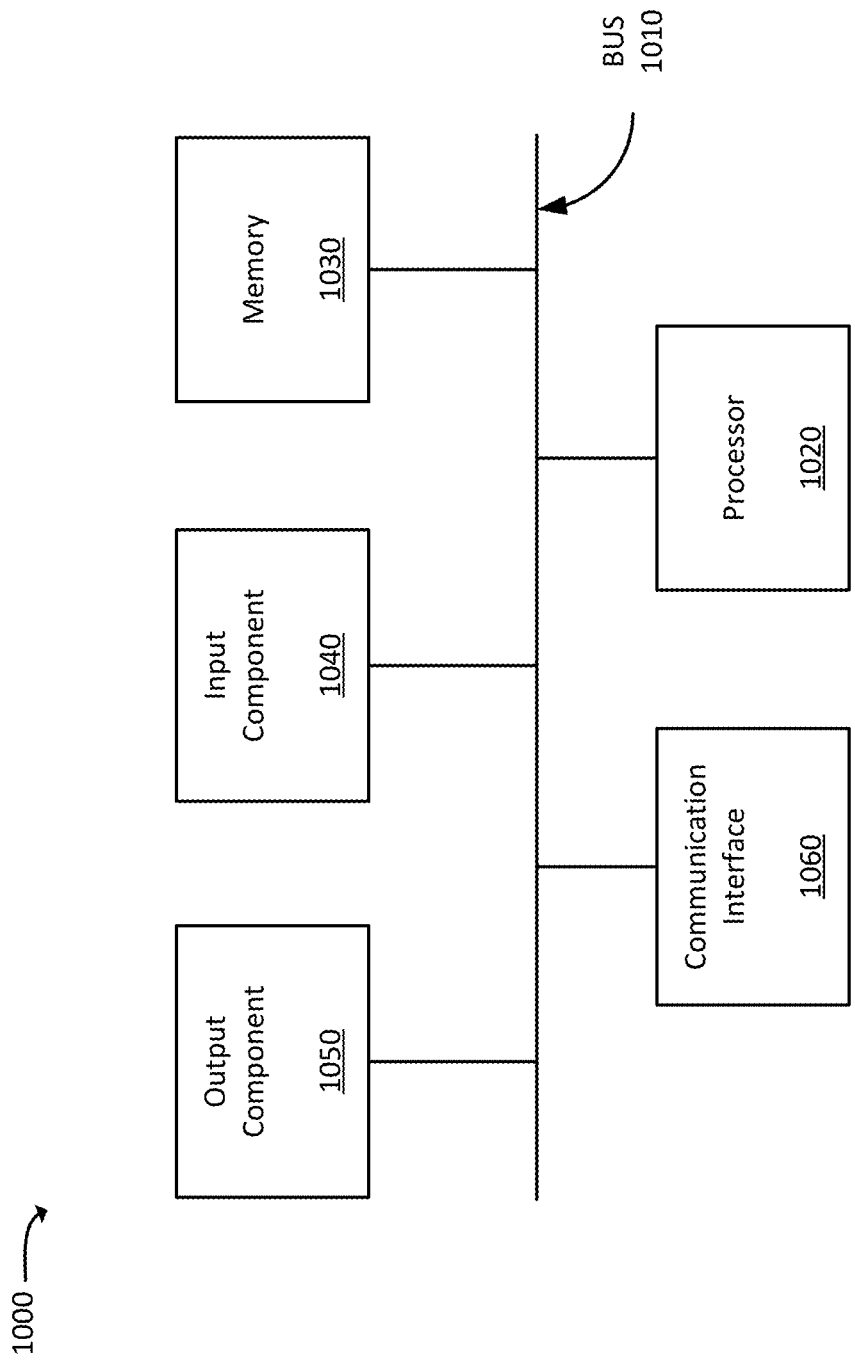
FIG. 10 is a diagram of example components of a computing device.

FIG. 10 is a diagram of example components of a device 1000. One or more of the devices described above (e.g., as described with respect to FIGS. 1, 2, 3, 8, and 9) may include one or more devices 1000. Device 1000 may include bus 1010, processor 1010, memory 1020, input component 1030, output component 1040, and communication interface 1060. In another implementation, device 1000 may include additional, fewer, different, or differently arranged components.

Bus 1010 may include one or more communication paths that permit communication among the components of device 1000. Processor 1010 may include a processor, microprocessor, or processing logic that may interpret and execute instructions. In one implementation, processor 1010 may include a dedicated encoding component. For example, a set-top box may include a general purpose processor and one or dedicated encoders/decoders. Memory 1020 may include any type of dynamic storage device that may store information and instructions for execution by processor 1010, and/or any type of non-volatile storage device that may store information for use by processor 1010.

Input component 1030 may include a mechanism that permits an operator to input information to device 1000, such as a keyboard, a keypad, a button, a switch, etc. Output component 1040 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1010 executing software instructions stored in a computer-readable medium, such as memory 1020. A computer-readable medium may be defined as a non-transitory memory device. A memory device may include space within a single physical memory device or spread across multiple physical memory devices. The software instructions may be read into memory 1020 from another computer-readable medium or from another device. The software instructions stored in memory 1020 may cause processor 1010 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6 and 7, the order of the blocks may be modified in other implementations. Further, non-dependent blocks may be performed in parallel. In some implementations, additional blocks may be performed before, after, or in between the described blocks.

Additionally, while series of signals have been described with regard to FIG. 8, the order of the signals may be modified in other implementations. Also, non-dependent signals may be sent and/or received in parallel. In some implementations, additional signals may be transmitted before, after, or in between the described signals.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
maintaining, by a server device, presence information relating to an operational state of each of a plurality of set-top boxes installed at customer premises;
receiving, by the server device, an indication of content that is to be encoded;
selecting, by the server device, a set-top box, of the plurality of set-top boxes, to encode the content, the set-top box being selected based on the operational state of the plurality of set-top boxes;
transmitting, by the server device and to the selected set-top box, instructions to initiate encoding of the content and to provide an encoding format for the content; and
updating, by the server device, the presence information to reflect a result of encoding of the content by the selected set-top box.

2. The method of claim 1, further comprising:
receiving a message from the selected set-top box indicating successful or unsuccessful completion of the encoding of one or more segments corresponding to the content, wherein the updating of the presence information is performed based on the received message.

3. The method of claim 1, wherein the plurality of set-top boxes provide multimedia programming to televisions at the customer residences based on fiber optic network connections to the customer residences.

4. The method of claim 1, wherein the instructions include instructions relating to a codec to use for the encoding, a bit rate associated with the encoding, or encryption techniques associated with the encoding.

5. The method of claim 1, wherein the content includes television programming.

6. The method of claim 1, wherein the maintaining the presence information relating to the operational state of the plurality of set-top boxes includes:
maintaining information relating to processing load associated with the plurality of set-top boxes; and
maintaining information relating to segments of the content that are being encoded by the plurality of set-top boxes.

7. The method of claim 1, further comprising:
compensating accounts associated with users of the plurality of set-top boxes based on the users associated with the plurality of set-top boxes enabling content encoding by the plurality of set-top boxes.

8. The method of claim 1, wherein the instructions providing the encoding format for the content additionally include an identification of one or more destination addresses to which the encoded version of the content should be transmitted.

9. The method of claim 1, wherein the presence information is maintained for other encoding devices in addition to the set-top boxes, and wherein the selecting further includes:
selecting at least one other encoding device to encode the segment.

10. The method of claim 1, wherein selection of the set-top box further includes:
selecting a plurality of set top boxes to independently encode the segment.

11. A server device comprising:
one or more memories to store:
presence information relating to an operational state of each of a plurality of set-top boxes installed at customer premises,
a set of computer-executable instructions; and
a processor configured to execute the set of computer-executable instructions, wherein executing the set of computer-executable instructions causes the processor to:
receive an indication of content that is to be encoded;
select a set-top box, of the plurality of set-top boxes, to encode the content, the set-top box being selected based on the operational state of the plurality of set-top boxes;
transmit, to the selected set-top box, instructions to initiate encoding of the content and to provide an encoding format for the content; and
update the presence information to reflect successful or unsuccessful completion of the encoding of the content by the selected set-top box.

12. The server device of claim 11, wherein executing the set of computer-executable instructions further causes the processor to:
receiving a message from the selected set-top box indicating successful or unsuccessful completion of the encoding of one or more segments corresponding to the content, wherein the updating of the presence information is performed based on the received message.

13. The server device of claim 11, wherein the plurality of set-top boxes provide multimedia programming to televisions at the customer residences based on fiber optic network connections to the customer residences.

14. The server device of claim 11, wherein the instructions include instructions relating to a codec to use for the encoding, a bit rate associated with the encoding, or encryption techniques associated with the encoding.

15. The server device of claim 11, wherein executing the set of computer-executable instructions further causes the processor to:
maintaining, as part of the presence information, information relating to processing load associated with the plurality of set-top boxes; and
maintaining, as part of the presence information, information relating to segments of the content that are being encoded by the plurality of set-top boxes.

16. The server device of claim 11, wherein the instructions provide the encoding format for the content additionally include an identification of one or more destination addresses to which the encoded version of the content should be transmitted.

17. The server device of claim 11, wherein selection of the set-top box further includes:
selecting a plurality of set top boxes to independently encode the content.

18. A system comprising:
a content delivery server to stream content, over a wireless network, to mobile devices, the content delivery server storing the content as a plurality of encoded segments; and
a discovery server to:
maintain presence information relating to an operational state of a plurality of set-top boxes installed to provide television content to customers of a telecommunication provider;

direct encoding of the television content by the plurality of set-top boxes to obtain the plurality of encoded segments of content, the directing of the encoding including
selecting a set-top box, of the plurality of set-top boxes, to encode the television content, the set-top box being selected based on the operational state of the plurality of set-top boxes, and
transmitting, to the selected set-top box, instructions to initiate encoding of the television content and to provide an encoding format for the television content;
receive a result relating to the encoding of the television content by the plurality of set-top boxes; and
update the presence information to reflect a result of encoding of the television content.

19. The system of claim 18, wherein the discovery server is further to:
direct encoding of the segments such that each segment, corresponding to a particular content item, is encoded a plurality of times using a plurality of different encoding formats.

20. The system of claim 19, further comprising:
a content origin server to receive, from the plurality of set-top boxes, the plurality of encoded segments, and to deliver the plurality of encoded segments to the content delivery server.

* * * * *